United States Patent [19]

Zeümer et al.

[11] Patent Number: 4,560,204
[45] Date of Patent: Dec. 24, 1985

[54] HEIGHT-ADJUSTMENT DEVICE FOR A MOTOR-VEHICLE SAFETY BELT

[75] Inventors: Monika Zeümer, Hamburg; Klaus Straszewski, Verl, both of Fed. Rep. of Germany

[73] Assignee: Autoflug GmbH, Rellingen, Fed. Rep. of Germany

[21] Appl. No.: 552,508

[22] Filed: Nov. 17, 1983

[30] Foreign Application Priority Data

Nov. 18, 1982 [DE] Fed. Rep. of Germany ....... 3242593

[51] Int. Cl.$^4$ ............................................. A62B 35/02
[52] U.S. Cl. .................................... 297/483; 280/808; 297/468
[58] Field of Search .................... 297/483, 468, 481; 280/808

[56] References Cited

U.S. PATENT DOCUMENTS

| | | | |
|---|---|---|---|
| 4,398,751 | 8/1983 | Wahlmann | 280/808 |
| 4,456,283 | 6/1984 | Michael et al. | 297/483 |
| 4,466,666 | 8/1984 | Takada | 297/468 |
| 4,470,618 | 9/1984 | Ono | 297/483 |

FOREIGN PATENT DOCUMENTS 2081568 2/1982 Fed. Rep. of Germany ...... 280/808

Primary Examiner—James T. McCall
Attorney, Agent, or Firm—Becker & Becker

[57] ABSTRACT

A device for adjusting the height of the upper mounting or guide fitting of a motor-vehicle safety belt. The device includes a guide rail having arresting openings arranged above one another on both sides, and a slide which is movable in the guide rail, carries the mounting or guide fitting, and has locking elements which are displaceable transversely to the direction of movement of the slide, against spring pressure, from a locking position into an unlocked position via at least one push button. Problems to be overcome, on the one hand, include being able to carry out convenient and safe adjustment by hand and, on the other hand, preventing automatic adjustment as a result of uncontrollable external influences. To make the adjustment device easy to operate, shock-proof, and at the same time also practicable for smaller motor vehicles, there is located on the push button a guide member which has at least one inclined guide into which an extension of the associated locking element engages; the length and path direction of the inclined guide are such that the associated locking element is displaced from one extreme position to the other when the locking element traverses the inclined guide via the extension. The extensions of the locking elements, and the associated inclined guides, are preferably made to engage positively.

16 Claims, 7 Drawing Figures

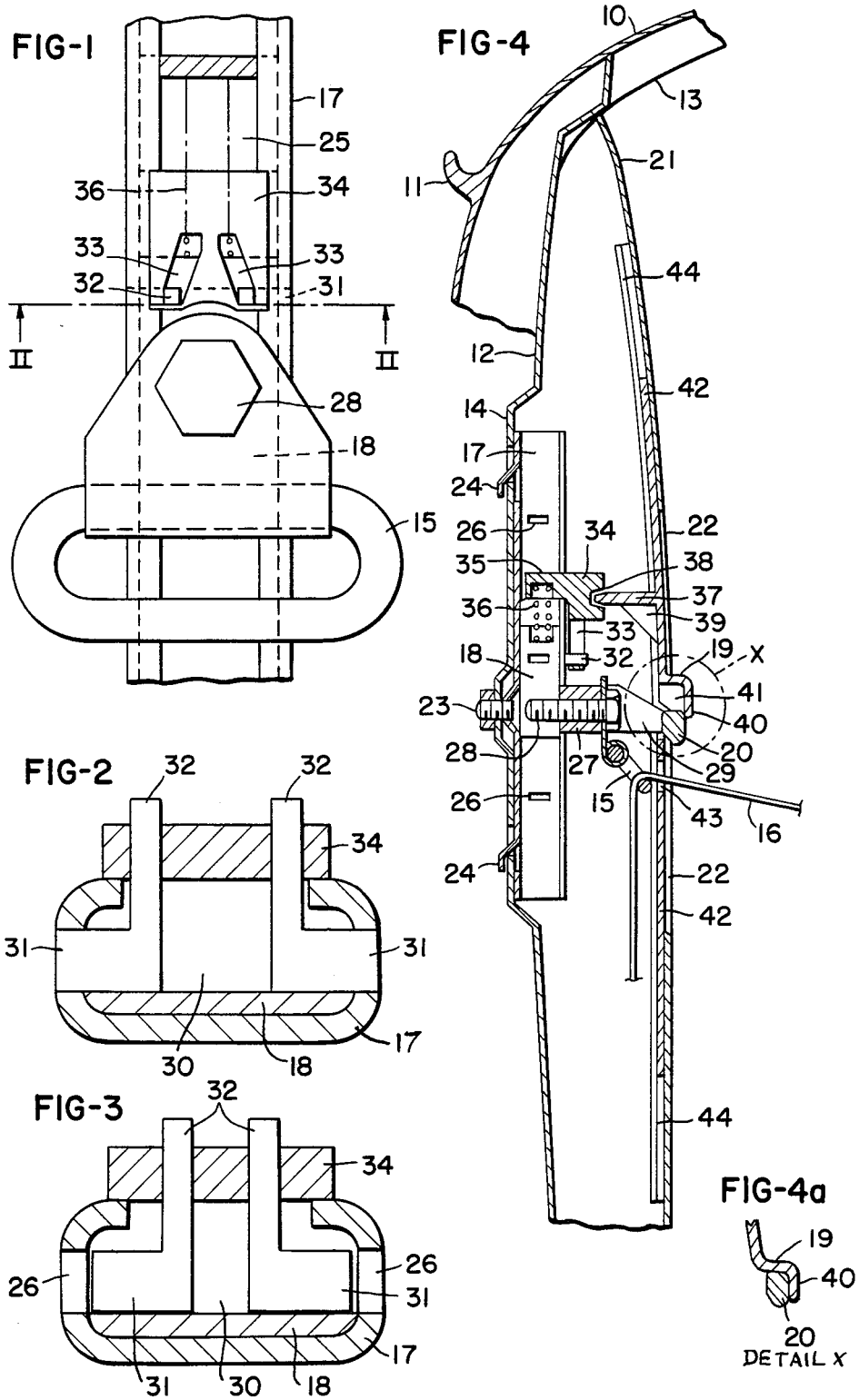

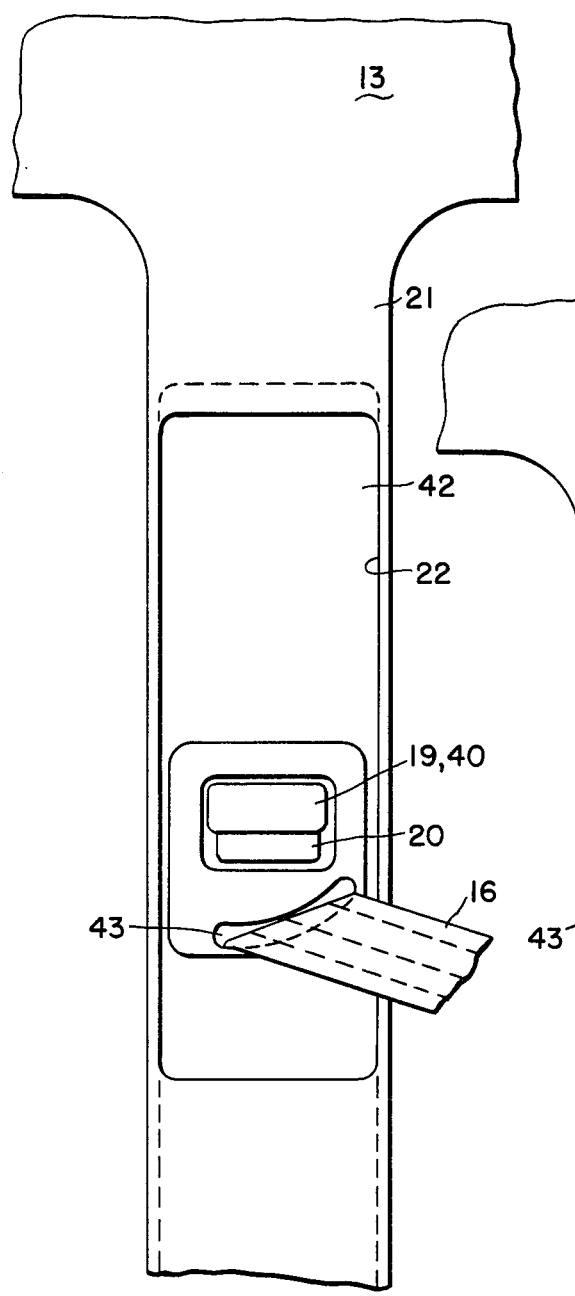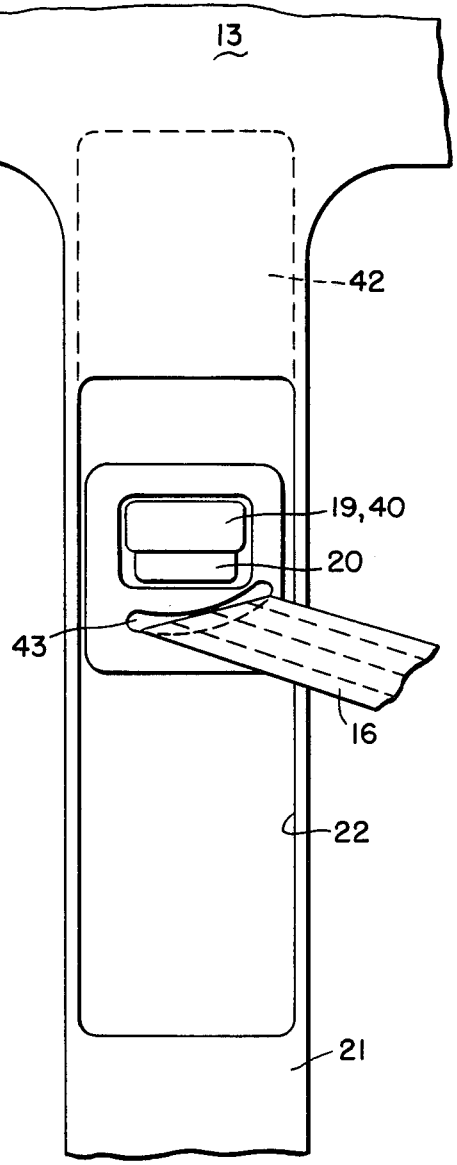

HEIGHT-ADJUSTMENT DEVICE FOR A MOTOR-VEHICLE SAFETY BELT

BACKGROUND OF THE INVENTION

1. Field of the Invention

The present invention relates to a device for adjusting the height of the upper mounting or guide fitting of a motor-vehicle safety belt, and comprises a guide rail having arresting openings arranged above one another on both sides, and a slide which is movable in the guide rail, carries the mounting or guide fitting, and has locking elements which are displaceable transversely to the direction of movement of the slide, against spring pressure, from a locking position into an unlocked position by means of at least one push button.

2. Description of the Prior Art

French patent application No. 76 26 181 (publication No. 23 62 641) represents a height-adjustment device of this general type. In particular, the guide rail of this known device is an integral part of a sheet-metal box which is closed on all sides and has a front aperture in which the slide appears and through which an eyebolt for receiving a fitting for the safety belt extends into the interior of the vehicle. Furthermore, two push buttons project through the aperture; these buttons can be compressed transversely to the direction of displacement of the slide, with the result that locking bolts connected to them can be drawn inwardly out of holes located on both sides of the box, so that the slide can be displaced and the height of the eyebolt changed.

A disadvantage of the known height-adjustment device is that a person wishing to adjust his safety belt correctly has to exert with his hand forces which are directed at an angle to one another, namely, on the one hand, releasing the locking bolts transversely to the guide rail and, on the other hand, displacing the slide in the longitudinal direction of the guide rail, with the push buttons having to be kept constantly pressed together. A further material disadvantage of the known device is that, in the event of a collision of the vehicle in question with an appreciable force component in the longitudinal direction of the vehicle, the locking elements automatically move out of their arresting openings because of the inertia of the respective components, and consequently can no longer guarantee the correctly set height of the upper point of articulation of the safety belt. In another exemplary embodiment of the French patent application mentioned, this applies correspondingly as regards force components in the transverse direction of the vehicle. Finally, another disadvantage of the state of the art described in that the height-adjustment device is not suitable for smaller motor vehicles, because the device would collide with the customary roof lining due to the arrangement of the push buttons; also, the partially open guide box on both sides of the slide represents the danger of injury.

An object of the present invention is to provide an improved device of the aforementioned general type, especially for use in smaller vehicles having a closed design, this device being shock-proof. This means that the device is not displaced in an uncontrolled manner as result of impacts from any direction, and being incorporated as smoothly as possible into the interior design of the vehicle body. A further object of the present invention to ensure, as a rule, that the belt force is introduced into the part fixed to the vehicle under the best possible directional conditions.

BRIEF DESCRIPTION OF THE DRAWINGS

These objects, and other objects and advantages of the present invention, will appear more clearly from the following specification in conjunction with the accompanying drawings, in which:

FIG. 1 is a partially schematic plan view of the essential part of one embodiment of the inventive height-adjustment device, showing the inclined guides for the locking elements;

FIG. 2 is a cross-sectional view on an enlarged scale, taken along the line II—II in FIG. 1, with the locking elements engaged;

FIG. 3 is an illustration corresponding to FIG. 2, but with the locking elements disengaged;

FIG. 4 is a view of part of a cross-section through a roof pillar of a passenger vehicle having a height-adjustment device, with the detail X being shown in a first operating position;

FIG. 4a shows the detail X of FIG. 4 in a second operating position;

FIG. 5 is a view of the roof pillar according to FIG. 4 from the vehicle interior, with the mounting or guide fitting in a lower vertical position; and FIG. 6 is a view corresponding to FIG. 5, with the fitting in an upper vertical position.

SUMMARY OF THE INVENTION

The device of the present invention is characterized primarily in that there is provided on or associated with the push button, a guide member having, at least one inclined guide into which an extension of the associated locking element engages; the length and path direction of the inclined guide are such that the associated locking element is displaced from one extreme position to the other when it traverses the inclined guide by means of the extension.

Pursuant to further advantageous embodiments of the present invention, the extensions of the locking elements, and the associated inclined guides, may be made to engage positively. The locking elements, together with their extensions, may be L-shaped.

The extensions of the locking elements may project from the guide rail, which is C-shaped in a way known per se, and may engage there into the inclined guides of the guide member. A helical compression spring which is effective in the direction of displacement of the slide may be disposed between the slide and the guide member.

The slide, below the locking elements, may carry a bolt to which the mounting or guide fitting for the safety belt is attached pivotably. The push button connected to the guide member may project downwardly in the form of a Z over the bolt, to which an additional member for the push button may be mounted in such a way that an interacting finger pressure can be exerted from above and below. The push button and the additional member may be connected to or associated with one another by means of at least one straight-line guide.

The guide rail can be mounted, in a way known per se, by means of a screw bolt to a part fixed to the motor vehicle. The guide rail may be provided with arresting openings positioned in such a way that in the middle normal position of the mounting or guide fitting, or of the slide, the longitudinal axis of the bolt for holding the mounting or guide fitting is aligned with the longitudinal axis of the screw bolt for mounting the guide rail. Hook-shaped extensions for engaging into the part fixed to the vehicle may be arranged on the guide rail above and below the mounting screw.

Sheet-like extensions may be attached, especially formed in one piece, on the Z-shaped push button; these are large enough to cover the guide rail in any position of the slide. Guide grooves of a covering means for the height-adjustment device may be provided at the longitudinal edges along both sides of the sheet-like extensions; the covering means may have an opening which is of a size corresponding at least to the largest range of movement of the push button, and through which the push button projects. The mounting or guide fitting may be located within the space covered by the sheet-like extensions. In the region of the fitting, a slot may be provided which is intended for the safety belt and from which the safety belt enters into the passenger space.

The Z-shaped push button may be connected positively to the guide member by means of a leg thereof which is directed toward the guide rail, because the leg end engages, for example, into a transverse groove in the guide member. That leg of the Z-shaped push button intended for finger engagement may be provided with an angled continuation or extension which extends over the additional member, thus resulting in a cavity into which the additional member penetrates when the height-adjustment device is actuated.

The guide member may be provided with an extension which is shaped in the manner of a slide, and which is guided above the slide, in the same way as the latter, so as to move by sliding in the guide rail. The helical compression spring may be inserted between the slide and the extension of the guide member.

The present invention affords advantages in many respects. First, the height-adjustment device is secured, as regards maintaining a set height thereof, against forces which act like shocks and which are exerted from any direction. Furthermore, the push button, from which the actuation of the locking elements originates, is located so far down, in relation to the bolt which carries the mounting or guide fitting, that the device can even be installed in motor vehicles having a relatively low interior height, without being detrimental to a person's comfort. As a result, height adjustment can be effected in an upward direction, for example through two engagement positions, without difficulties arising. Finally, the design according to the present invention allows the height-adjustment device to be integrated to a very great extent into the inner wall design of the vehicle construction, with a result that not only is an orderly appearance ensured, but also bumps, soiling, etc. are prevented.

DESCRIPTION OF PREFERRED EMBODIMENTS

Referring now to the drawings in detail, the part of the body of a motor vehicle illustrated in FIG. 4 includes a sheet-metal roof 10 with a rain gutter 11, and an inner sheet-metal section 12 of a roof pillar, for example the so-called B-column. Under the roof, a roof lining 13 made of flexible material adjoins the section 12 at the top. A height-adjustment device for an upper guide fitting 15 of a safety belt 16 is located in a recess 14 of the section 12. The height-adjustment device essentially comprises a guide rail 17, a slide 18 guided therein, and a push button 19 with an additional member 20. To cover the device towards the interior of the vehicle, there is provided a facing 21 which extends from the floor (not shown) up to the roof lining 13. The facing 21 has an opening 22 in which the push button 19 appears. The guide rail 17 is approximately C-shaped in cross-section, as can be seen in FIGS. 2 and 3. The guide rail 17 is connected securely against movement to the section 12 of the B-column by means of a threaded bolt 23 having a nut thereon and two hooks 24 which engage into appropriate perforations. Towards the vehicle interior, the guide rail 17 is open in the form of a longitudinal slot 25 (FIG. 1), and on each of respective side faces thereof, the guide rail is provided with five rectangular arresting openings 26, so that five pairs of arresting means are obtained.

The slide 18 comprises a strong steel shaped part, the cross-section of which corresponds to the inner shape of the C-shaped guide rail 17, so that the slide 18 is guided positively in the guide rail 17, and can be moved back and forth, namely up and down, along the length of the rail 17. An extension 27 of the slide 18 extends outwardly through the longitudinal slot 25 in the guide rail 17; the extension 27 serves not only to receive a fixing screw 28 for the guide fitting 15, but also to retain the additional member 20, which extends in the form of a cross-bar between two side walls 29 in the manner of a handle. When FIG. 4 is considered, there is apparent that the slide 18 can be displaced in the guide rail 17 when the additional member 20 is subjected to force from above or below.

Above the extension 27, the slide 18 has a groove or slot 30 which is fashioned transversely to the longitudinal guide rail 17 and in which, according to FIGS. 2 and 3, two L-shaped locking elements 31, which are disposed as mirror images one of the other, are mounted so as to be transversely displaceable. The legs of the locking elements 31, on the one hand, are designed so that they fit positively into the arresting openings 26 in the guide rail 17 the legs of the locking elements 31 on the other hand, project with extensions 32 from the longitudinal slot 25 in the guide rail 17 and there engage positively in inclined guides 33 worked into or provided in a guide member 34 of block-shaped form, as can be seen in FIG. 1. The guide member 34 as such is located outside the C-profile of the guide rail 17, but projects with an extension 35 (FIG. 4) into the C-profile, where the guide member 34 is guided in the same way as the slide 18. A helical compression spring 36 is disposed between the slide 18 and the extension 35 of the guide member 34, so that the slide 18 and the guide member 34, 35 are maintained spread apart as a result of the force of this spring 36. In this spread-apart position of the parts 18 and 34, 35, the extensions 32 of the locking elements 31 are respectively located at the bottom ends of the inclined guides 33 (FIG. 1). The length and angular position of the inclined guides 33 are selected in such a way that when the slide 18 and the guide member 34, together with the extension 35, are pressed together against the force of the spring 36, the locking elements 31 are guided positively inwardly by means of the extensions 32, so that the locking elements 31 are drawn inwardly out of the arresting openings 26, and the slide 18 is released in the guide rail 17.

Because of the positive guidance of the extensions 32 in the inclined guides 33, together with their inclined position relative to lines parallel to the longitudinal axis of the vehicle, forces which arise in the manner of shocks and which act on the locking elements 31 cannot cause these elements to move inwardly out of the arresting openings 26 by themselves. Consequently, when the safety belt has been fastened by a person, the height desired for the upper mounting or guide point of the safety belt belt is always guaranteed. Because of the configuration of the locking elements 31 together with adjoining components, the foregoing also applies to force components which could act obliquely on the vehicle from the side.

To actuate the guide member 34 together with the extension 35, i.e. to displace these components against the force of the spring 36 in the direction of the slide 18, the push button 19 is made essentially Z-shaped; the upper leg of the Z forms a driving member 37, the free edge of which engages in a transverse groove 38 in the guide member 34 and drives or takes along the latter. For reinforcement, the driving member 37 is supported by a gusset member 39. This gusset member joins the middle portion of the Z-shaped push button 19, while the lower leg of the Z serves as a support for the fingers, especially the index finger and middle finger. This support is then angled once again to form an extension 40, which encloses a cavity 41 into which the additional member 20 penetrates when the push button 19 and the additional member 20 are pressed together between the thumb and the first two fingers (see detail X). As a result of the connection between the parts 34, 37, and 38, the spring 36 also acts on the push button 19, so that after the button 19 and the additional member 20 thereof have been released, the latter comes out of the cavity 41 again, i.e., the parts 19 and 20 move away from one another.

The middle part of the Z-shaped actuating member 19, 37 for height adjustment has a flush upwardly extending panel 42 which, according to FIGS. 5 and 6, also extends downwardly and around the push button 19, where beneath the additional member 20, the panel 42 has a slightly curved transverse slot 43 as a passage for the belt 16. The lateral edges of the panel 42 are guided on both sides of the facing 21 or the opening 22 in elongate grooves 44 formed by narrow L-shaped rails which are formed or attached on the inner face of the facing 21 on both sides of the opening 22. The panel 42 is long enough, on both sides of the push button 19, to ensure that the opening 22 is closed in any position of the height-adjustment device.

As can be seen in FIG. 4, the longitudinal axes of the threaded bolt 23 and of the fixing screw 28 are aligned with one another when the slide 18 assumes the middle position; in such middle position, the locking elements 31 are engaged into the middle pair of arresting openings 26, i.e., two pairs of arresting openings 26 are free both above and below. Consequently, from this middle position, the slide 18 can be adjusted upwardly or downwardly over two locking positions in each direction. However, the actual finger engagement region, even in the uppermost position, remains at the height of the fixing screw 28; this is achieved because the path of the operating action is conducted from the button 19 via the driving member 37 and the guide member 34 upwardly, and from there proceeds down again to the locking elements 31. As a result, the device can be adapted more effectively to confined conditions in smaller vehicles.

When a person wishes to appropriately adjust the height of the upper guide fitting 15 of the safety belt 16 in view of his body size and, for example, the inclination of the backrest, the person grasps the additional member 20 from below with a thumb, and places an index finger and middle finger on the push button 19 from above. At this moment, the spring 36 is still relaxed, and the additional member 20 has moved downwardly out of the cavity 41. The thumb and the two fingers are now pressed against one another, with the result that the additional member 20 penetrates into the cavity 41; i.e., the push button 19 with the angled portion 40 is pushed downwardly over the additional member 20, as shown in FIG. 4a. Consequently, the panel 42 also moves down a corresponding amount at the same time. Simultaneously, the driving member 37 pulls the guide member 34, together with the extension 35, downwardly against the force of the spring 36 via the transverse groove 38, so that the spring 36 is compressed. The inclined guides 33 consequently likewise move downwardly, and the extensions 32 of the locking elements 31 are forced to move in the inclined guides 33, specifically inwardly. As a result, the locking elements 31 are drawn out of the arresting openings 26, thus releasing the slide 18. The person's fingers have now pressed the button 19 and the additional member 20 together, and in this state the person can move the slide 18 upwardly or downwardly in the guide rail 17 by hand; at the same time, the panel 42 is also displaced in the appropriate direction in the grooves 44 of the facing 21, but without exposing the opening 22. When the desired height is reached, there is merely necessary to somewhat relax the force exerted by the fingers, whereupon the locking elements 31 can engage into the respective arresting openings, which occurs immediately when the locking elements and the arresting openings are aligned with one another. This can easily be felt with the fingers, because the force of the spring 36 then endeavors to move the button 19 and the additional member 20 away from one another. During the locking operation, the extensions 32 of the locking elements 31 move down again in the inclined guides 33, until the spring 36 is virtually completely relaxed.

The present invention is, of course, in no way restricted to the specific disclosure of the specification and drawings, but also encompasses any modifications within the scope of the appended claims.

What we claim is:

1. A device for adjusting the height of the upper mounting or guide fitting of the safety belt of a motor vehicle; said device comprising:
   a guide rail having two sides on which are successively arranged, one above the other, arresting openings;
   a slide which is movable in said guide rail and carries said guide fitting;
   locking elements adapted to engage in said arresting openings, said locking elements being displaceable transversely to the direction of movement of said slide, against spring pressure, from one extreme position, a locked position, into a second extreme position, an unlocked position, and vice versa; at least one of said locking elements being provided with a first extension;
   at least one push button for effecting said displacement of said locking elements; and
   a guide member which is operatively connected with said at least one push button, and is provided with at least one inclined guide into which said at least one first extension of said locking elements engages; the length and path direction of said at least one inclined guide being such that the associated locking element is displaced from one of said extreme positions to the other when said first extension thereof traverses said inclined guide so that on the one hand unlocking movement of said locking elements is avoided in the direction of forces effective during a side impact encountered by the vehicle and on the other hand there is made possible that a push button movement is converted into a locking movement arranged at right angles thereto via said inclined guide.

2. A device according to claim 1, in which said first extensions of said locking elements, and the associated inclined guides, are adapted to engage positively.

3. A device for adjusting the height of the upper mounting or guide fitting of the safety belt of a motor vehicle; said device comprising:
 a guide rail having two sides on which are successively arranged, one above the other, arresting openings;
 a slide which is movable in said guide rail and carries said guide fitting;
 locking elements adapted to engage in said arresting openings, said locking elements being displaceable transversely to the direction of movement of said slide, against spring pressure, from one extreme position, a locked position, into a second extreme position, an unlocked position, and vice versa; at least one of said locking elements being provided with a first extension;
 at least one push button for effecting said displacement of said locking elements; and
 a guide member which is operatively connected with said at least one push button, and is provided with at least one inclined guide into which said at least one first extension of said locking elements engages; the length and path direction of said at least one inclined guide being such that the associated locking element is displaced from one of said extreme positions to the other when said first extension thereof traverses said inclined guide; said first extensions of said locking elements, and the associated inclined guides, being adapted to engage positively; each of said locking elements, together with its first extension, being L-shaped.

4. A device according to claim 3, in which said guide rail has a C-shaped cross-section, and in which said first extensions of said locking elements project from said guide rail and then engage into said inclined guides of said guide member.

5. A device according to claim 4, which includes a compression spring which is disposed between said slide and said guide member, and is effective in the direction of displacement of said slide.

6. A device according to claim 5, in which said guide member is provided with a second extension which is shaped in the manner of a slide, and is guided above said slide, in the same manner as the latter, so as to move by sliding in said guide rail.

7. A device according to claim 6, in which said compression spring is disposed between said slide and said second extension of said guide member.

8. A device for adjusting the height of the upper mounting or guide fitting of the safety belt of a motor vehicle; said device comprising:
 a guide rail having two sides on which are successively arranged, one above the other, arresting openings;
 a slide which is movable in said guide rail and carries said guide fitting;
 locking elements adapted to engage in said arresting openings, said locking elements being displaceable transversely to the direction of movement of said slide, against spring pressure, from one extreme position, a locked position, into a second extreme position, an unlocked position, and vice versa; at least one of said locking elements being provided with a first extension;
 at least one push button for effecting said displacement of said locking elements; and
 a guide member which is operatively connected with said at least one push button, and is provided with at least one inclined guide into which said at least one first extension of said locking elements engages; the length and path direction of said at least one inclined guide being such that the associated locking element is displaced from one of said extreme positions to the other when said first extension thereof traverses said inclined guide; said slide including a bolt on that side of said locking elements remote from said guide member, said guide fitting being pivotably attached to said bolt; said at least one push button projects in the form of a z over said bolt; and which includes an additional member for said push button, said additional member being mounted to said bolt in such a way that an interacting finger pressure can be exerted from two sides.

9. A device according to claim 8, in which said push button and said additional member are associated with one another by means of at least one straight-line guide.

10. A device according to claim 9, which includes a screw bolt for mounting said guide rail to a part which is fixed to said motor vehicle; and in which said arresting openings of said guide rail are positioned in such a way that in a middle normal position of said guide fitting, i.e. of said slide, the longitudinal axis of said bolt of said slide is aligned with the longitudinal axis of said screw bolt of said guide rail.

11. A device according to claim 10, in which said guide rail is provided with hook-shaped extensions on both sides of said screw bolt for engaging said part which is fixed to said vehicle.

12. A device according to claim 8, which includes sheet-like extensions which are attached to said Z-shaped push button and are large enough to cover said guide rail in any position of said slide.

13. A device according to claim 12, in which said sheet-like extensions have two longitudinal edges; in which covering means are provided for said device, said covering means having guide grooves at said two longitudinal edges of said sheet-like extensions; said covering means also being provided with an opening corresponding in size at least to the greatest range of movement of said push button, with the latter projecting through said opening.

14. A device according to claim 13, in which said sheet-like extensions cover a space within which said guide fitting is located; and in which one of said sheet-like extensions, in the vicinity of said guide fitting, is provided with a slot which is intended for said safety belt, and from which the latter enters the passenger space of said vehicle.

15. A device according to claim 8, in which said guide member includes a transverse groove, and in which said Z-shaped push button includes a leg which is directed toward said guide rail and positively engages said transverse groove of said guide member.

16. A device according to claim 15, in which said Z-shaped push button includes a leg which is intended for finger engagement, said last-mentioned leg being provided with an angled extension which extends over said additional member and forms a cavity into which the latter can enter when said device is actuated.

* * * * *